United States Patent
Weiss et al.

[11] Patent Number: 5,911,293
[45] Date of Patent: Jun. 15, 1999

[54] MOTOR VEHICLE FRICTION CLUTCH WITH AUTOMATIC WEAR ADJUSTMENT

[75] Inventors: Michael Weiss, Dittelbrunn; Reinhold Weidinger, Unterspiesheim, both of Germany

[73] Assignee: Fichtel & Sachs Ag, Schweinfurt, Germany

[21] Appl. No.: 08/816,732

[22] Filed: Mar. 14, 1997

[30] Foreign Application Priority Data

Mar. 16, 1996 [DE] Germany ............................ 196 10 427

[51] Int. Cl.$^6$ ..................................................... F16D 13/50
[52] U.S. Cl. ..................................... 192/70.25; 192/111 A
[58] Field of Search ............................. 192/70.25, 111 A

[56] References Cited

U.S. PATENT DOCUMENTS

| 3,485,330 | 12/1969 | Reiff . |
| 5,513,735 | 5/1996 | Uenohara . |

FOREIGN PATENT DOCUMENTS

| 2920932 | 11/1979 | Germany . |
| 4306688 | 11/1993 | Germany . |
| 4412107 | 11/1994 | Germany . |
| 29507449 | 8/1995 | Germany . |
| 7243452 | 9/1995 | Japan . |
| 2264989 | 9/1993 | United Kingdom . |
| 2298251 | 8/1996 | United Kingdom . |
| 9701043 | 1/1997 | WIPO . |

OTHER PUBLICATIONS

Zulieferer + Maschinenausrüster '86 (Suppliers + Machinery and Equipment Outfitters 1986), pp. 47–48.

*Primary Examiner*—Charles A Marmor
*Assistant Examiner*—Saiel Rodriguez
*Attorney, Agent, or Firm*—Nils H. Ljungman & Associates

[57] ABSTRACT

A motor vehicle friction clutch with automatic wear adjustment comprises a flywheel which rotates about a rotational axis, a clutch housing positioned with contact on the flywheel to turn with the flywheel, a pressure plate that is non-rotationally connected to the clutch housing and can be axially displaced with respect to the flywheel and a clutch disc that is rotationally arranged between the pressure plate and the flywheel with interposition of friction linings around the rotational axis in relation to the flywheel. A membrane spring element is installed to pre-stress the pressure plate in the direction of the flywheel. At least one clearance sensor is provided at the pressure plate and the clearance sensor has a control lever segment which acts with the wear adjustment device and an axial stop segment which acts with the flywheel. Through a friction ratcheting of the control lever segment, the clearance sensor is fixated on the pressure plate by pre-stressing in the axial direction.

12 Claims, 8 Drawing Sheets

MOTOR VEHICLE FRICTION CLUTCH WITH AUTOMATIC WEAR ADJUSTMENT

BACKGROUND OF THE INVENTION

1. Field of the Invention

The present invention relates to a motor vehicle friction clutch with automatic wear adjustment. The clutch comprises a flywheel which rotates about a rotational axis, a clutch housing which is fixed to the flywheel to turn with the flywheel, a pressure plate that is non-rotationally connected to the clutch housing and which pressure plate can be axially displaced in relation to the flywheel and a clutch disc that is rotationally arranged between the pressure plate and the flywheel. Friction linings are disposed around the rotational axis in relation to the flywheel with a membrane spring element installed to pre-stress or pre-tension the pressure plate in the direction of the flywheel. The membrane spring element acts on the pressure plate in a radial outer area through a wear adjustment device and the membrane spring element is supported in a radial center area at the clutch housing. The clutch can have at least one clearance sensor which is arranged at the pressure plate, and the clutch has a control lever segment that acts with the wear adjustment device. The clutch can also have an axial stop segment which acts with the flywheel to adjust for wear, whereby the clearance sensor can be displaced axially in relation to the pressure plate. At least one spring element can hold the clearance sensor to the pressure plate by means of a friction ratchet to axially fix or position the clearance sensor in relation to the pressure plate.

2. Background Information

A known motor vehicle friction clutch with the construction described above is shown in DE-A-43 06 688. This publication discloses a motor vehicle friction clutch where an axially extending connecting hole or boring is provided in a radial outer periphery of the pressure plate. This connecting hole is axially penetrated by a pin. The pin forms the axial stop segment for the clearance sensor. To axially set the clearance sensor with respect to the pressure plate, the outer diameter of the pin and the inner diameter of the hole in the pressure plate are adjusted in such a manner that even a slight tilting or angling of the pin in relation to the pressure plate will cause a friction press-fit or friction ratchet or connection of the pin to the pressure plate. In other words, the angling of the pin with respect to the hole will cause the pin to be biased against the side of the hole. To create this moment of tilt, a coil pressure spring that acts between the pressure plate and the free end segment of the pin is provided, whereby the longitudinal axis of the spring is tilted in relation to the longitudinal axis of the pin and the center axis of the connecting hole. This spring thus tilts the pin in relation to the center axis of the hole and thereby causes the friction ratchet or biasing.

For the clearance sensor to function correctly in this known motor vehicle friction clutch, the connecting hole in the pressure plate must be highly precise with respect to its diameter and its positioning on the pressure plate. In assembling the clearance sensor, the coil pressure spring must first be slid or positioned over a pin which is separate from the control lever segment of the clearance sensor. The pin is then guided through the connecting hole and into the pressure plate. The end segment of the pin, which was guided through the connecting hole, can then be connected with the control lever segment. This work process is rather complicated because the clearance sensor must be assembled directly on the pressure plate.

DE-A-44 12 107 shows a known motor vehicle friction clutch where the moment of tilt is not provided by a coil pressure spring acting between the pin and the pressure plate. Instead, it provides a coil tension spring which creates tensible force between the pressure plate and a radial outer end segment of the control lever segment of the clearance sensor and thus achieves to the desired moment of tilt. Here again, the pin is fixed in a connecting hole in the pressure plate by friction ratchet in the axial direction. The assembly of this motor vehicle friction clutch, and particularly the clearance sensor, is subject to the same problems as previously described.

OBJECT OF THE INVENTION

The object of the present invention is thus to provide a motor vehicle friction clutch with automatic wear adjustment that is especially easy to manufacture and to assemble with respect to the clearance sensor.

SUMMARY OF THE INVENTION

The present invention solves this problem by providing a motor vehicle friction clutch with automatic wear adjustment comprising a flywheel that turns around a rotational axis, a clutch housing fixed to the flywheel to turn with the flywheel, and a pressure plate that is non-rotationally connected to the clutch housing and can be axially displaced with respect to the flywheel. Between the pressure plate and the flywheel, a clutch disc can be provided with interposition of friction linings, or in other words friction linings disposed between the pressure plate and the flywheel, and the clutch disc can be rotatable around the rotational axis in relation to the flywheel.

The pressure plate can be pre-stressed or biased toward the flywheel by means of a membrane spring element, whereby the membrane spring element can act on the pressure plate in a radial outer area through a wear adjustment device and can be supported in a radial center area at the clutch housing. At least one clearance sensor can be arranged at the pressure plate, and the at least one clearance sensor can comprise a control lever segment which acts with the wear adjustment device. The at least one clearance sensor can further comprise an axial stop segment which acts with the flywheel to adjust for wear, whereby the clearance sensor can be displaced axially in relation to the pressure plate, and at least one spring element, which can hold the clearance sensor to the pressure plate by means of a friction ratchet to axially set or position the clearance sensor with respect to the pressure plate. The axial fixation of the clearance sensor can be achieved by a friction ratchet of a control lever segment at the pressure plate.

The friction ratchet was thus moved from the area of the axial stop segment, as is the case in known friction clutches with automatic wear adjustment, to the area of the control lever segment. By doing so, the function of the axial stop segment is no longer relevant in achieving the friction ratchet, especially in the assembly of the clearance sensor. This can permit much more flexibility in the design of the clearance sensor, especially with respect to the axial stop segment, and the clearance sensor can now be mounted to the pressure plate as a complete unit.

In so mounting the clearance sensor to the pressure plate, a first pin element may be provided on the side of the pressure plate that faces away from the flywheel. The pin element can extend in axial direction and penetrate an opening in the control lever segment, whereby the friction ratchet of the control lever can be achieved on the first pin element by pre-stress. The complete clearance sensor unit thus can be slid or positioned onto the pin element fixated on the pressure plate, and no further assembly steps are required inside the clearance sensor unit. By providing an opening in the control lever segment to achieve the friction ratchet in interaction with the first pin element, the work process required for drilling a corresponding opening in the pressure plate can be significantly simplified. The opening in the control lever can be made especially by punching because the control lever is generally made of sheet metal.

A plate or disc spring element can be provided as well, and said plate spring element can have a first end segment which rests on the control lever segment and a second end segment which is supported by the pressure plate and/or the wear adjustment device to pre-stress the control lever in the friction ratchet. The spring element can also be pre-assembled with the clearance sensor prior to mounting the pressure plate to simplify the assembly of the motor vehicle friction clutch even further.

The inventive motor vehicle friction clutch can be designed in such a manner that it comprises a second pin element which second pin element is positioned to make contact in a radial direction within the first pin element on the pressure plate and penetrates a second opening in the control lever segment. The friction clutch can further comprise a first spring element which can act between a free end segment of the first pin element and the control lever segment to push the control lever segment shut in the direction of the pressure plate, and a second spring element, which second spring element is arranged in the area of the second pin element and can act between the pressure plate and the control lever segment to push the control lever segment away from the pressure plate. In the embodiment of the motor vehicle friction clutch according to the invention, the moment of tilt can be achieved by two spring elements which act in opposite directions.

The second spring element can be a coil pressure spring which encloses the second pin element.

The first spring element can also be a coil pressure spring which encloses the first pin element.

The first and/or the second pin element can be positioned to make contact on the pressure plate in an especially simple manner by press-fitting, riveting, etc. Although this requires corresponding holes in the pressure plate, these holes do not require the same level of precision as known friction clutches with automatic wear compensation, wherein the friction ratchet is achieved by the holes in the pressure plate.

If the axial stop segment is designed in one piece with the control lever segment, the number of operations necessary to manufacture the clearance sensor can be decreased even further because an additional assembly of the axial stop segment and the control lever segment is not necessary. For example, the entire clearance sensor can be punched as a single piece of sheet metal and then shaped into the desired form.

Alternately, it is also possible that the axial stop segment comprises a stop pin which is positioned to make contact on the control lever segment.

As described above, known friction clutches with automatic wear compensation achieve the moment of tilt that is required to generate the friction ratchet between the clearance sensor and the pressure plate by means of coil pressure springs or coil tension springs. In the assembly of known motor vehicle friction clutches, these springs must be mounted as separate components in the appropriate operations, as described above, whereby they must be prepared for assembly by pressing or depressing the coils until a position suitable for assembly is achieved. The assembly of known motor vehicle friction clutches, especially the clearance sensor, is labor-intensive and complicated.

In another aspect of the present invention, once wear has occurred to the point that the stop makes contact with the flywheel, during the time that the pressure plate is not engaged, the clearance between the pressure plate and the reference element can be held in a constant position by the friction ratchet or frictional contact or wedging effect or friction press-fit that occurs between the first pin element and the reference element. In the event that the first pin element functions as the stop segment, the clearance between the pressure plate and the reference element can be fixed by the friction ratchet of the stop pin and the pressure plate. Subsequently, each time the pressure plate is engaged, the friction ratchet is released and the pressure plate can move freely. Once the pressure plate is disengaged, the reference element returns to the friction ratcheted position. However, as wear occurs to the friction lining, the relative forces acting on the reference element will change and a new ratcheted position on the pin element will be found. This grip and release action, or stiction action, is very similar to a ratcheting effect, where, with increasing wear, the friction ratcheted position will continue moving along the pin element until it reaches a limit position.

In one aspect of the invention, the forces acting on the reference element cause the reference element to rotate, or to form a moment of tilt, with respect to the pressure plate. The degree of tilt necessary to cause the grab and release action need not be significant. In one embodiment, the tilt necessary (relative to its initial position substantially transverse to the axis of rotation) may be 10 degrees or greater. In another embodiment the necessary tilt can be about 5 degrees. In still another preferred embodiment, the necessary tilt can be about 1 degree or less. In another preferred embodiment the necessary tilt can be about 0.1 degrees. Another preferred embodiment can generate the grab and release action with incremental variances of the position of the reference element of approximately 0.01 degrees. Other possible embodiments based upon other intervals of the moment of tilt may also be suggested.

In another aspect, the present invention can therefore provide a motor vehicle friction clutch with automatic wear adjustment which comprises: a flywheel that is rotatable around a rotational axis, a clutch housing fastened to the flywheel to turn with the same, a pressure plate that is non-rotationally connected to the clutch housing and can be axially displaced with respect to the flywheel, a clutch disc that is rotationally arranged between the pressure plate and the flywheel with interposition of friction linings around the rotational axis in relation to the flywheel, a membrane spring element installed to pre-stress the pressure plate in a direction of the flywheel, whereby the membrane spring element acts on the pressure plate in a radial outer area through a wear adjustment device and is supported in a radial center area at the clutch housing, at least one clearance sensor which is arranged at the pressure plate and has a control lever segment that acts with the wear adjustment device, an axial stop segment which acts with the flywheel to adjust for wear, whereby the clearance sensor can be displaced axially in relation to the pressure plate, and at least one spring element which holds the clearance sensor to the pressure plate by means of a friction ratchet to axially fasten the clearance sensor in relation to the pressure plate. In doing so, at least one spring element is comprised of a plate spring.

Such plate springs are inexpensive and easy to manufacture, and require less effort to adjust them in the desired assembly position as compared to coil pressure springs or coil tension springs, for example.

If the first end segment of the plate spring is additionally positioned to make contact on the control lever segment, the resulting clearance sensor unit can be largely pre-assembled prior to fitting on the pressure plate.

The second end segment of the plate spring can be supported by the pressure plate to pre-stress the clearance sensor in the friction ratchet.

In supporting the second end segment of the plate spring with the pressure plate, the plate spring can be slightly curved away from the pressure plate in a curved segment, and can be positioned to make contact on the pressure plate in the area of the curved segment.

The second end segment of the plate spring can also be supported by the wear adjustment device to pre-stress the clearance sensor in the friction ratchet. The moment of tilt achieved by the plate spring can thus be further enhanced. In addition, the support on the wear adjustment device positions, i.e., torsion fixes the clearance sensor in relation to the pressure plate. Supporting the plate spring by the wear adjustment device results in the additional advantage that the corresponding displacement of the clearance sensor in relation to the pressure plate keeps the pre-stress effect of the plate spring at a constant during subsequent wear of the friction linings and the corresponding adjustment of the clearance by the wear adjustment device.

In its second end segment, the plate spring can comprise at least one axial spring tongue segment which engages at a radial outer periphery of the wear adjustment device and substantially extends in the axial direction.

The plate spring can also comprise at least one radial spring tongue segment which overlaps the wear adjustment device on the side extending away from the pressure plate and extends in radial inward direction.

If the plate spring has a radial spring tongue segment and two axial spring tongue segments which are arranged on opposite sides in relation to the axial spring tongue segment, the positioning function of the plate spring is additionally improved for the entire clearance sensor in relation to the pressure plate.

The clearance sensor can comprise an axial stop pin which is solidly connected to the control lever or designed as one piece with the control lever and penetrates an opening in the pressure plate and extends toward the flywheel, whereby the friction ratchet is achieved by the interaction of the axial stop pin and the opening in the pressure plate.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The present invention is explained in detail by referring to the preferred embodiments shown in the enclosed illustrations.

DESCRIPTION OF THE PREFERRED EMBODIMENT

Figure 1:
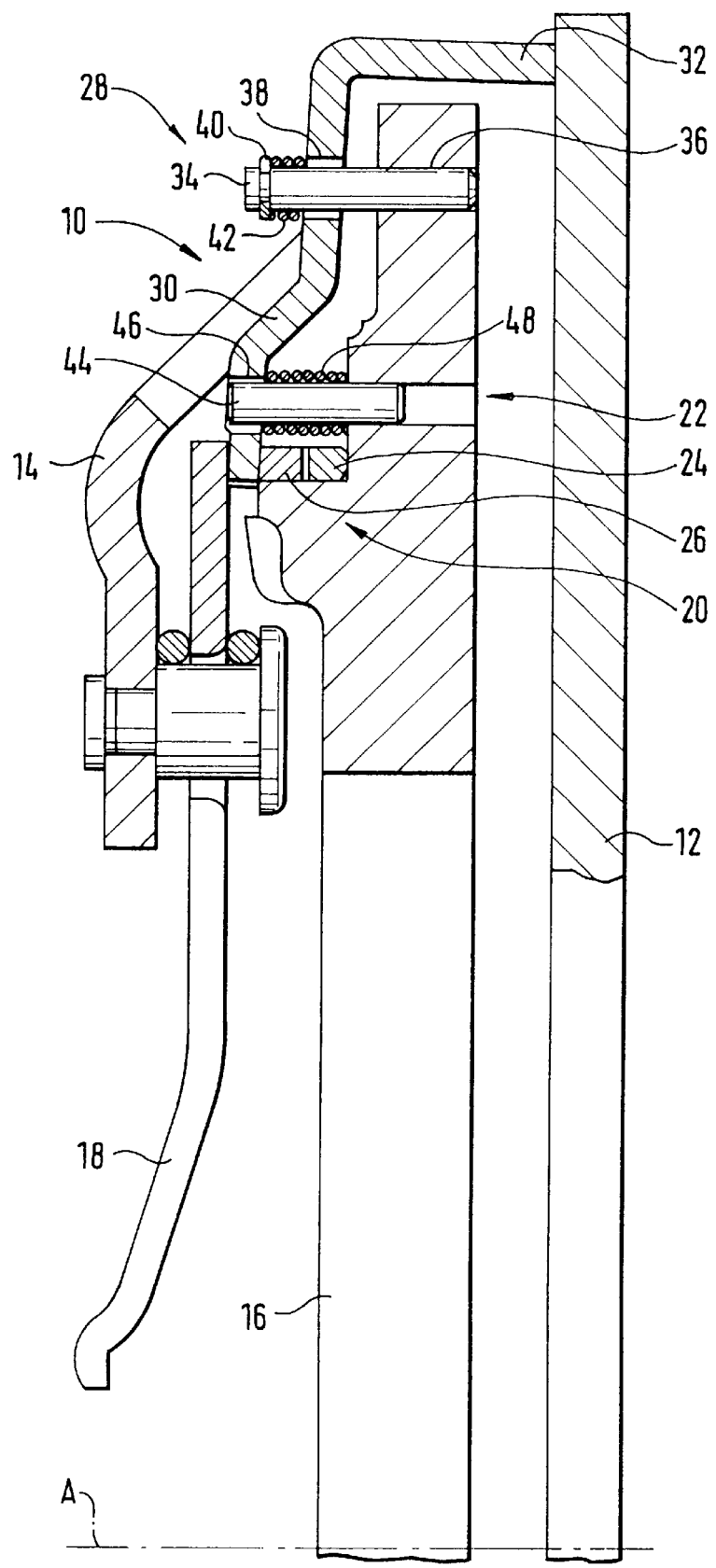
FIG. 1 shows a schematic partial longitudinal cut through a motor vehicle friction clutch according to the invention corresponding to a first embodiment.
Figure 1A:
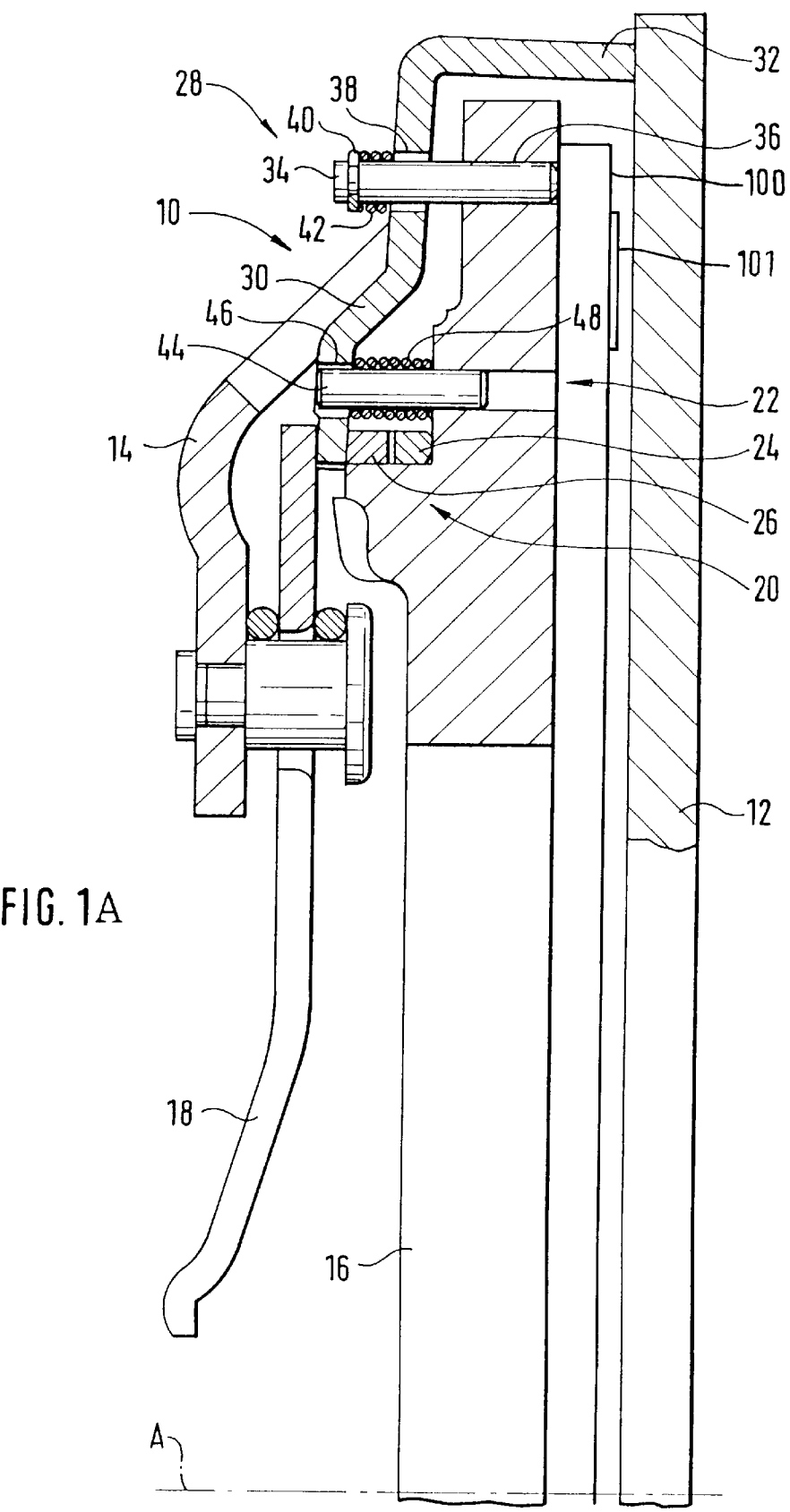
FIG. 1A shows the friction clutch as shown in FIG. 1 including additional components.

FIG. 1 shows a schematic partial longitudinal view of a first embodiment of motor vehicle friction clutch 10 according to the invention. The motor vehicle friction clutch 10 comprises a flywheel 12 which can be attached in the known manner to the crankshaft of a motor, for example, and is rotatable with the crankshaft around a rotational axis A. The motor vehicle friction clutch 10 also comprises a clutch housing 14 which is non-rotationally connected to the flywheel 12. Between the flywheel 12 and the clutch housing 14, a pressure plate 16 is movably inserted in the direction of rotational axis A and is coupled with the flywheel 12 in such a manner that both the housing 14 and the pressure plate 16 can turn together with the flywheel 12 around the rotational axis A. Through a wear adjustment device 20, a membrane spring 18 acts with a radial outer segment on the pressure plate 16 and presses the pressure plate 16 in the direction of the flywheel 12. In doing so, the membrane spring 18 is supported in a known manner by the clutch housing 14 in a radial center area. In a space 22 formed between the flywheel 12 and the pressure plate 16, a clutch disc 100 (FIG. 1A), is arranged with interposition of friction linings 101 (FIG. 1A). By means of the pre-stressed membrane spring 18, the pressure plate 16 presses the clutch disc 100 of the clutch 10 against the flywheel 12 when pressed, which provides for a torsion coupling between flywheel 12 and pressure plate 16 on the one hand and the clutch disc 100 on the other hand.

The wear adjustment device 20 comprises two ring elements 24, 26 which are positioned to make contact in axial direction and have complementary slant faces, for example on their facing frontal surfaces, so that a relative turn between rings 24 and 26 effects a change in their compounded axial direction. With respect to the specific construction of the ring elements, reference is made to the registered German utility model DE 295 07 449 U by the applicant of the present application, which is incorporated by reference herein.

The motor vehicle friction clutch 10 furthermore comprises at least one clearance sensor 28. The clearance sensor 28 comprises a control lever segment or reference element 30 as well as an axial stop segment 32. In the pressure plate 16, a first pin element 34 is included in receiving hole 36 of the pressure plate 16. The diameter of the receiving hole 36 is slightly smaller than the outer diameter of the first pin element 34, so that the first pin element 34 can be press-fitted into the receiving hole 36, and the first pin element 34 is thereby positioned immovably on the pressure plate 16. In the control lever segment 30 of clearance sensor 28, an opening or hole 38 is provided and the interior diameter of the hole 38 is slightly larger than the outer diameter of the first pin element 34. In the area of a free end of the first pin element 34, a retainer ring 40 is positioned with contact, and a coil pressure spring 42 is arranged between the retainer ring 40 and the control lever segment 30, with the coil pressure spring 42 enclosing the first pin element 34. The coil pressure spring 42 presses the control lever segment 30 and the clearance sensor 28 in the direction of the pressure plate 16 and in the direction of the flywheel 12.

A second pin element 44 is positioned radially nearer the axis of rotation A than the first pin element 34. The second pin element 44 may be positioned to make contact with the pressure plate 16 in such a manner as matches the mounting of the first pin element 34 to the pressure plate 16. The second pin element 44 projects into a second opening 46 in the control lever segment 30. In doing so, the interior diameter of the second opening 46 is dimensioned in such a manner in relation to the outer diameter of the second pin element 44 that the play created between the second pin element 44 and the second opening 46 is greater than the play created between the first pin element 34 and the first opening 38. Furthermore, a second coil pressure spring 48 which surrounds or encloses the second pin element 44 is arranged between the pressure plate 16 and the control lever segment 30. The coil pressure spring 48 pushes the control lever segment 30 away from the pressure plate 16. Due to the counter-effect of the first coil pressure spring 42 and the second coil pressure spring 48, the control lever segment 30 is being tilted with respect to axis A. Because of the previously described dimensioning of the first and second pin elements 34, 44 and first and second openings 38 and 46, a friction ratchet of the control lever segment 30 is created in the area of the first opening 38 on the first pin element 34.

When wear of the friction linings occurs during operation of the motor vehicle friction clutch according to the invention, the axial stop segment 32 of clearance sensor 28 will move increasingly in the direction of the flywheel 12. If the wear is so extensive that the axial stop segment 32 makes contact with the flywheel 12, the application pressure generated by the membrane spring 18 will compensate for or overcome or overpower the axial pressure of the first coil pressure spring 42 and can cause the clearance sensor 28 to move away from the pressure plate 16. During subsequent disengagement of the clutch, i.e., when the pressure plate 16 moves away from the flywheel 12, the control lever segment 30 resumes contact with the first pin element 34 in a friction ratchet position, but farther away from the pressure plate 16. This play is then adjusted by the wear adjustment device 20 in the known manner.

Figure 1B:
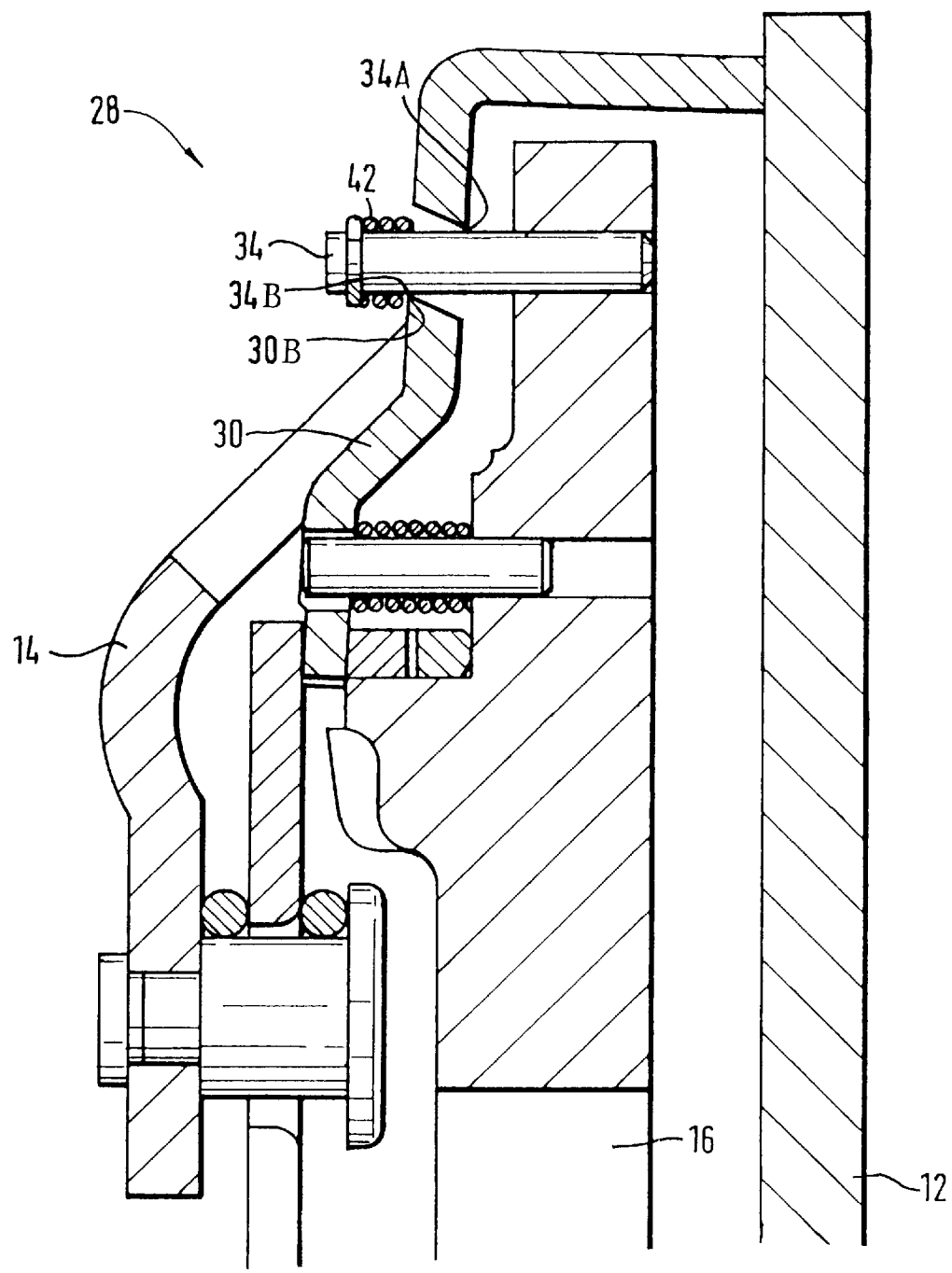
FIG. 1B shows the an enlarged detail of components of the friction clutch as shown in FIG. 1 where wear has occurred to the friction lining.

In one possible embodiment of the present invention, as wear occurs to the friction lining 101, the axial stop segment 32 can move into contact with the flywheel 12 when the pressure plate 16 is moved to engage the flywheel 12. When the pressure plate 16 is subsequently disengaged from the flywheel 12, as shown in FIG. 1B, the combination of forces acting on the reference element 30 can cause the reference element 30 to tilt with respect to the pressure plate 16. With this tilting moment, the first pin element 34 can make contact at points 34A and 34B and thus frictionally engage the reference element 30, at points 30A and 30B respectively. The second space 46, through which the second pin element 44 passes, can be made of sufficient size so that there is no frictional engagement of the second pin element 44 with the reference element 30. As the friction linings 101 continue to wear, points 30A and 30B of the reference element can make frictional engagement with the first pin element at a distance further from the pressure plate 16, in other words, points 34A and 34B will move axially away from the pressure plate 16. Ultimately, upon a certain amount of wear to the friction lining 101, the coil spring 42 can reach a point of maximum compression, after which no further increase to the moment of tilt of the reference element 30 will be possible. At this point, to prevent possible damage to the flywheel 12 and the pressure plate 16, no further wear compensation will take place.

Contrary to known wear compensators, the motor vehicle friction clutch according to the invention therefore does not hold the axial stop segment 32 of clearance sensor 28 in a friction ratchet at pressure plate 16, but rather at the control lever segment 30. This has the advantage that the hole 36 which is provided in the pressure plate 16 and the hole 46 in the reference element 30 do not have to be put into place with the same level of precision as would be the case if the friction ratchet were realized by the axial stop segment 32 and the pressure plate 16. In addition, the assembly of the motor vehicle friction clutch 10 according to the invention has been clearly simplified compared to that of known friction clutches because the openings 38 and 46 of the clearance sensor 28 must only be slid over the corresponding pin elements, and no further assembly steps are necessary to attach an axial stop segment.

Providing a press-fit opening 38 in the control lever segment 30 is furthermore a much simpler work process than placing high-precision holes into the pressure plate 16 because the opening can be achieved through punching, etc.

Figure 2:
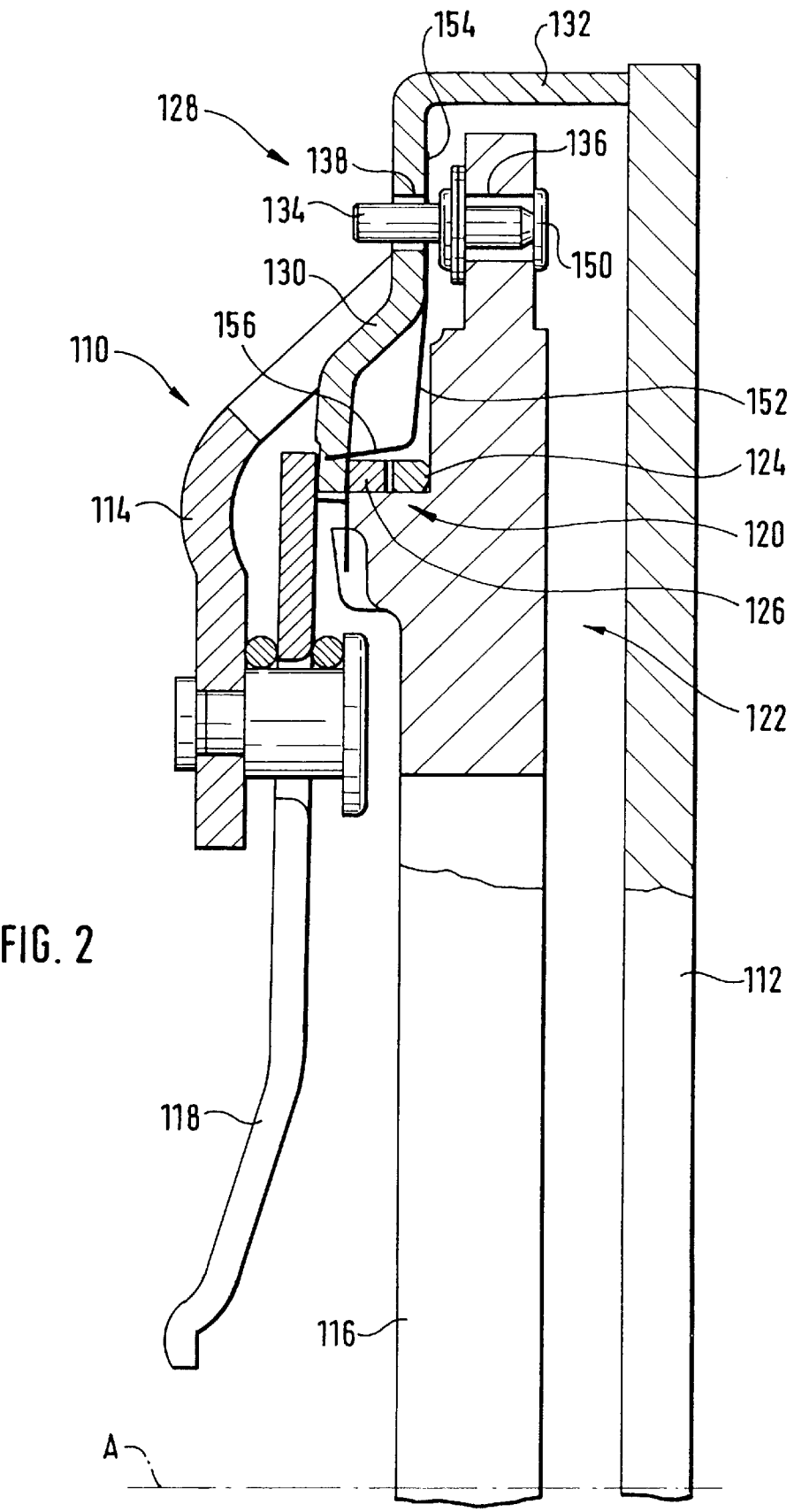
FIG. 2 shows a second embodiment of the motor vehicle friction clutch.
Figure 3:
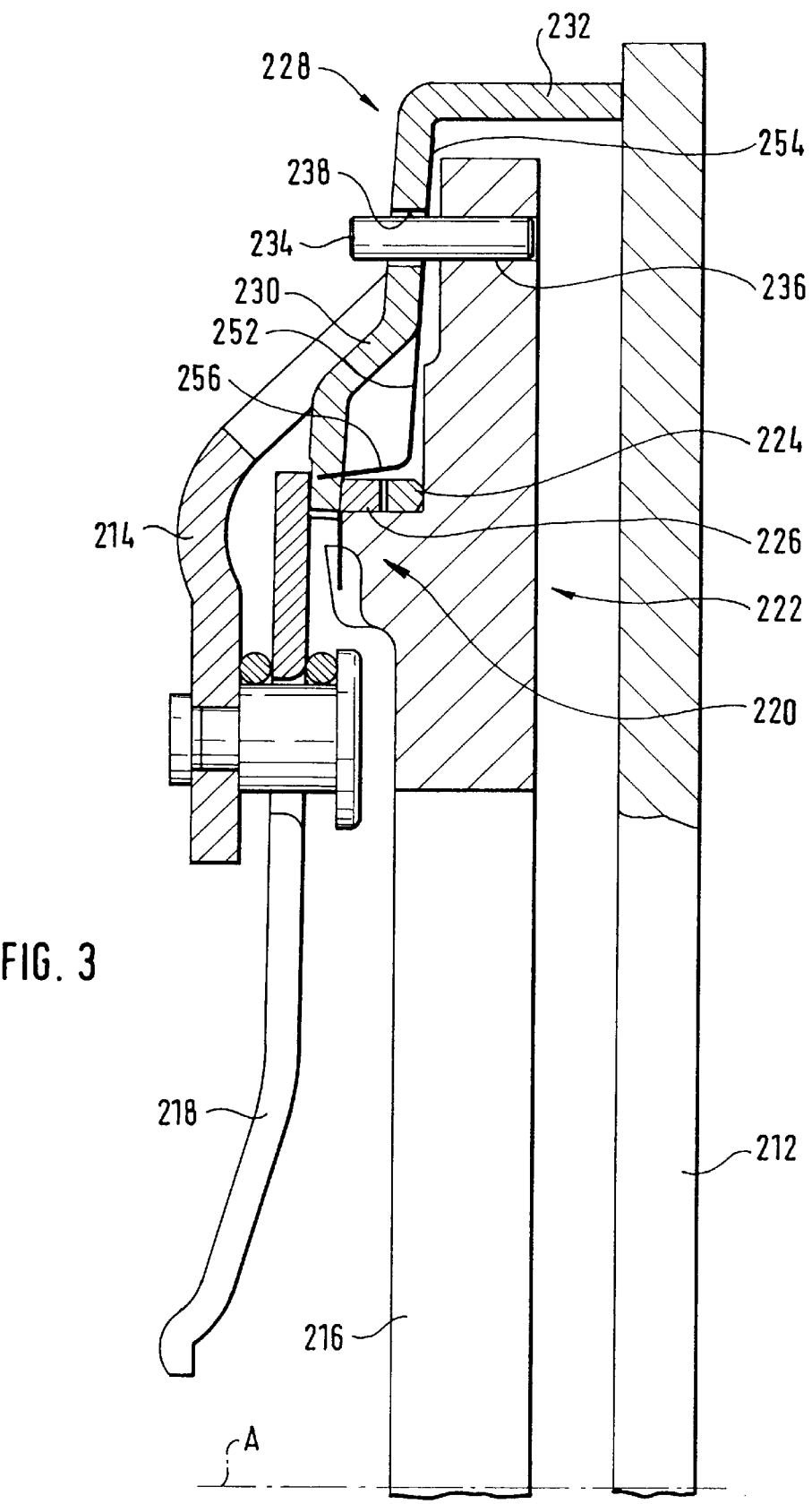
FIG. 3 shows a third embodiment of the motor vehicle friction clutch.

Although the clearance sensor 28 in FIG. 1 as well as in the subsequently described embodiments in FIGS. 2 and 3 is designed in such a manner that it is constructed in one piece from a control lever segment 30 and an axial stop segment 32, it is also possible to provide a clearance sensor 28 that is constructed of separately manufactured components. This clearance sensor would then consist of a control lever segment 330 and an axial stop pin 332 (see, for example, FIG. 4). However, because such an embodiment also does not provide an axial stop in a press-fit at the pressure plate as is done in the prior art, it is possible in this case as well to pre-assemble the control lever segment 330 and the axial stop pin 332 prior to mounting the clearance sensor 328 to the pressure plate 316, and to possibly run the axial stop pin 332 through axial holes 336 provided in the pressure plate 316 when mounting the clearance sensor 328 to the pressure plate 316. In such a case, the diameter of these holes 336 can then be dimensioned in such a manner that the friction ratchet is achieved between the axial stop pin 332 and the axial hole 336 of the pressure plate when the clearance sensor 328 is tilted. Alternatively, the diameter of these holes 336 can then be dimensioned in such a manner that no friction ratchet is achieved between the axial stop pin 332 and the axial hole 336 of the pressure plate when the clearance sensor 328 is tilted.

FIG. 2 shows a second embodiment of the motor vehicle friction clutch according to the invention. The construction of the motor vehicle friction clutch shown in FIG. 2 corresponds essentially to the construction shown in FIG. 1, and the following merely elaborates on the differences. The components in FIG. 2 which correspond to the components in FIG. 1 bear the same reference numbers as in FIG. 1, but were increased by 100.

In the embodiment represented in FIG. 2, the control lever segment 130 again shows an opening 138, through which the pin element 134 projects. In the embodiment of FIG. 2, the pin element 134 does not make direct contact with the pressure plate 116. Instead, the pressure plate has an opening 136 in which a plate spring rivet 150 is fixed. The plate spring rivet 150 fastens a plate spring 152 which couples the pressure plate 116 to the clutch housing 114 to transmit the moment of torsion. The plate spring rivet 150 is designed in such a manner that it also supports the pin element 134 and thus the plate spring rivet 150 positions the pin element 134 on the pressure plate 116.

In the area of opening 138, i.e., in a radial outer area, the first end segment 154 of the plate spring 152 is positioned at the control lever segment 130 of clearance sensor 128. A second end segment 156 of plate spring 152 is supported by the wear adjustment device 120. With respect to the embodiment options for the plate spring 152, reference is made to the detailed description of such plate springs in the following with respect to FIGS. 6 and 7.

By supporting the plate spring 152 with the wear adjustment device 120 on the one hand, and by solidly mounting the plate spring 152 on the control lever segment 130 on the other hand, the given basic form of plate spring 152 again creates a moment of tilt for the clearance sensor 128 which moves the control lever segment 130 away from the pressure plate 116 and thus again creates a friction ratchet of opening 138 on the pin element 134.

By providing such a plate spring 152, it is possible to largely assemble the clearance sensor 128 into one unit prior to assembling it with the pressure plate 116, which not only reduces but also simplifies the subsequent operations required in the fastening of the pressure plate.

FIG. 3 shows another embodiment of the motor vehicle friction clutch according to the invention. This embodiment again essentially corresponds to the embodiments described with reference to FIGS. 1 and 2, and the following only elaborates on the differences. The components in FIG. 3 which correspond to the components of the embodiment represented in FIG. 1 have the same reference numbers, but are increased by 200.

The embodiment represented in FIG. 3 again uses a plate spring 252 to generate the moment of tilt. The difference between this embodiment and the embodiment represented in FIG. 2 is that the pin element 234 is inserted in a hole 236 in the pressure plate 216 through press-fitting and is thus directly positioned at the pressure plate 216, as was described with respect to the embodiment of FIG. 1.

FIGS. 4 to 7 show embodiments of the motor vehicle friction clutch according to the invention where the moment of tilt to achieve the friction ratchet of the clearance sensor is achieved by a plate spring. With respect to the principal construction of the motor vehicle friction clutch shown in FIG. 4, reference is made to the previous descriptions to FIGS. 1 to 3. Components of the motor vehicle friction clutch shown in FIG. 4 which correspond to the components of the motor vehicle friction clutch shown in FIG. 1 bear the same reference numbers, but are increased by 300.

Figure 4:
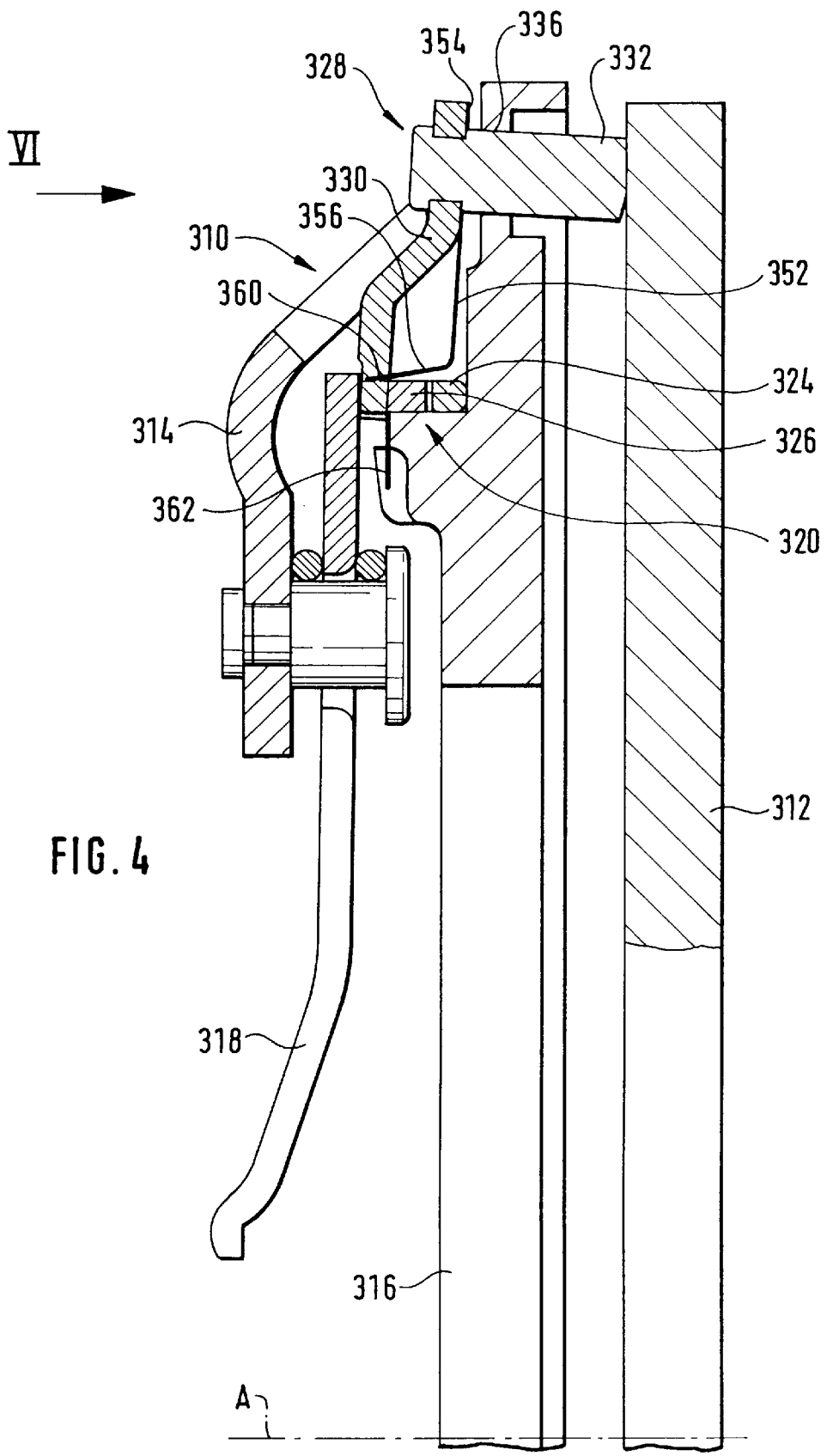
FIG. 4 shows a schematic partial longitudinal view of a motor vehicle friction clutch according to the invention corresponding to a fourth embodiment, which especially uses a plate spring to generate a moment of tilt of a clearance sensor.

In the embodiment of the motor vehicle friction clutch 310 shown in FIG. 4, the clearance sensor 328 is positioned by a friction ratchet effect in axial direction in relation to the pressure plate 316. The friction ratchet effect is generated by the axial stop segment 332 and the hole 336 in the pressure plate 316. In this embodiment, the axial stop segment 332 is designed as a pin element manufactured separately from the control lever segment 330. The moment of tilt required for the generation of the friction ratchet is achieved with a plate spring 352. The plate spring 352 is positioned with contact in a first radial peripheral end segment 354 at the control lever segment 330 in the area of contact of the control lever segment 330 with the axial stop segment 332. In a second radial inner end segment 356, the plate spring 352 is supported by the side of the wear adjustment device 320 which faces away from the pressure plate 316. It is shown in FIG. 6 that the plate spring 352 (which is illustrated in FIG. 6 in a dashed line) has three tongue segments 360, 362 and 364 in its second end segment 356. The tongue segment 362 is a center tongue segment which runs in a radial direction from the rotation axis A (shown in FIGS. 1–5) and engages in the back of the side of the wear adjustment device 320 which faces away from pressure plate 316. The tongue segments 360 and 364 each essentially run in axial direction and are positioned to make contact on a lateral circumference edge of the wear adjustment device 320, especially that of ring 326. The control lever segment 330 can extend radially inward through a gap forced between the tongue segments 360 and 364 to catch on the ring 326 of the wear adjustment device 320. The radial tongue segment 362 can essentially extend below the control lever segment 330 and through a recess provided in the ring 326 and the pressure plate 316. Because the plate spring element 352 is solidly connected with the control lever segment 330, the tongue segments 360, 362 and 364 define the position of the clearance sensor to secure it against unintentional rotation. Because the plate spring 352 is also supported by the ring 326 of the wear adjustment device 320 which ring 326 does not turn in the direction of the circumference and which ring 326 is always rigidly positioned with respect to the control lever segment 330 regardless of the operation of clearance sensor 328, the plate spring 352 provides a constant prestress for the clearance sensor 328 during any operating condition of clearance sensor 328, i.e., during any wear condition of the friction clutch.

Figure 5:
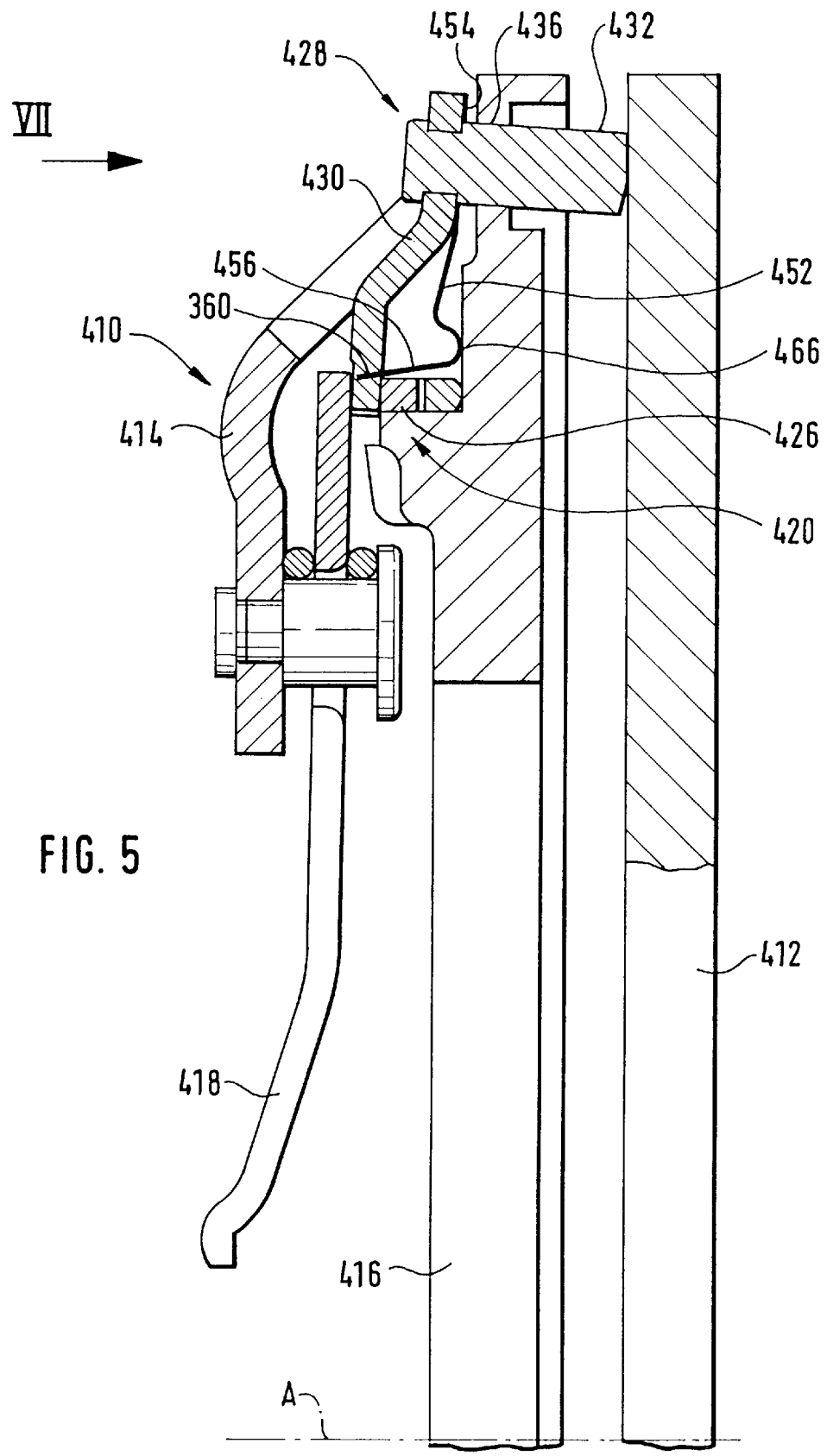
FIG. 5 shows a view of a fifth embodiment of the motor vehicle friction clutch.
Figure 6:
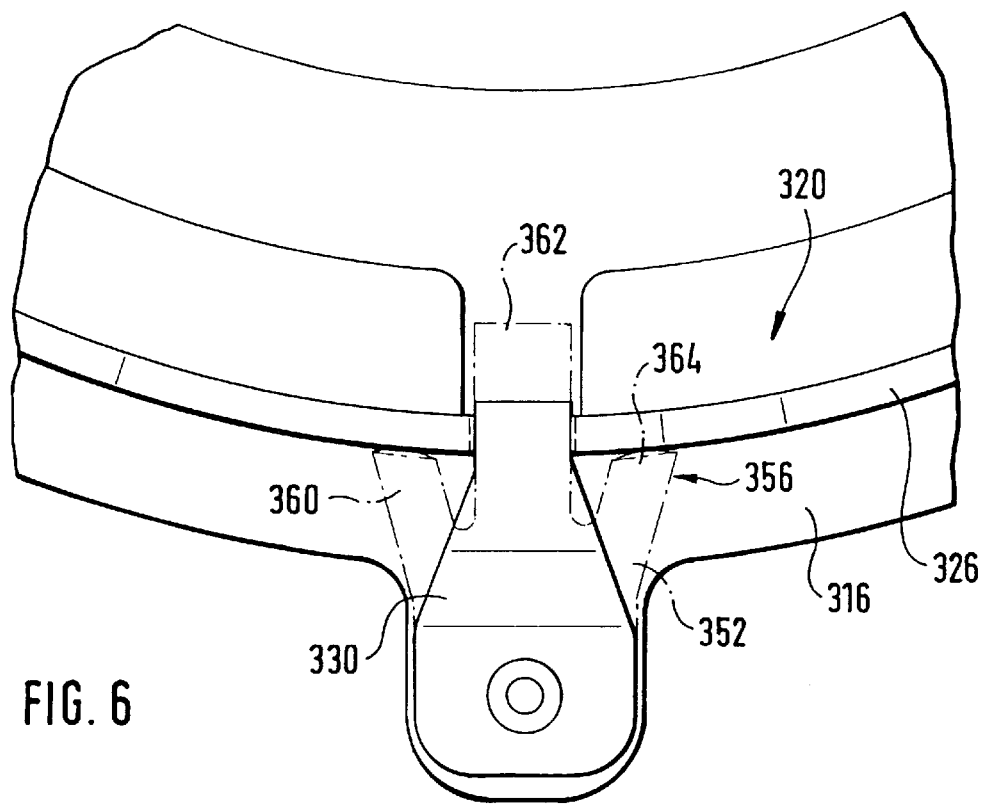
FIG. 6 shows a top view of the motor vehicle friction clutch in FIG. 4 in the viewing direction of arrow VI in FIG. 4.

FIG. 5 shows another embodiment of the motor vehicle friction clutch according to the invention. Components which correspond to components in FIG. 1 are labeled with the same reference number increased by 400.

The construction of the motor vehicle friction clutch 410 shown in FIG. 5 conforms essentially to the construction shown in FIG. 4, and only the differences are elaborated. The motor vehicle friction clutch 410 of FIG. 5 differs from the embodiment of FIG. 4 particularly with respect to the design of the plate spring 452. In its first end segment 454, the plate spring 452 is again solidly connected to the control lever segment 430 of the clearance sensor 428. Near its second end segment 456, the plate spring 452 is curved in such a manner that it extends away from the pressure plate 416. This curvature is designed in such a manner that it first forms a hump 466 which extends toward pressure plate 416, and plate spring 452 then extends away from the pressure plate 416 in the direction of its free end of the plate spring 452, where the plate spring 452 is then again supported by the ring 426 of the wear adjustment device 420. In addition to being supported by the ring 426, the plate spring in this embodiment is thus also supported by the pressure plate 416 in the area of hump 466.

Figure 7:
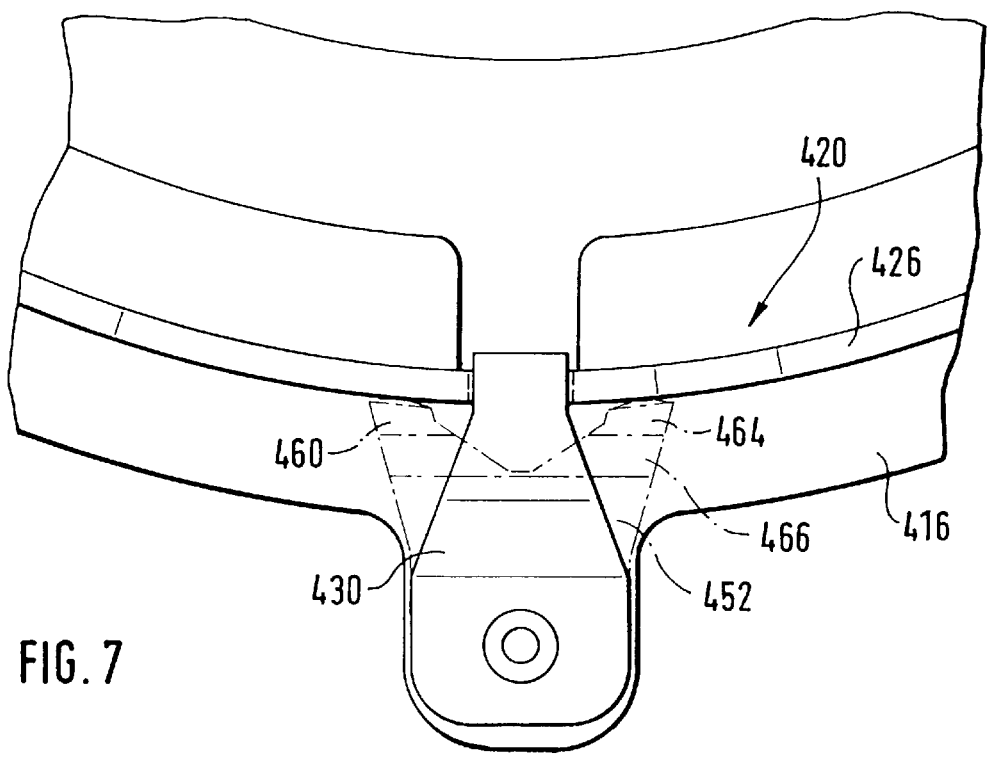
FIG. 7 shows a top view of the motor vehicle friction clutch in FIG. 5 in the viewing direction of arrow VII in FIG. 5.

It can be recognized in FIG. 7 that the plate spring 452 has the tongues 460 and 464 in this embodiment as well, and that said tongues support the plate spring on ring 426 of the wear adjustment device 420 and leave a space through which the control lever segment 430 can project radially inward. The tongue segments 460 and 464 again provide a rotation-setting of the clearance sensor 428.

Providing a plate spring element to generate the moment of tilt of the clearance sensor clearly simplifies the assembly of the motor vehicle friction clutch according to the invention in comparison to the state of the art. For one, the control lever segment and the plate spring can already be pre-assembled prior to attaching them to the pressure plate. On the other hand, it is no longer necessary to provide a spring element, for example, between a free end of the axial stop segment, i.e., the stop pin, and the pressure plate in order to achieve or support the moment of tilt. This means that the stop pin can be designed in such a manner that it does not have any radially outward projecting spring contact elements. Thus, the stop pin can already be solidly attached to the control lever segment and the plate spring element before it is attached to the pressure plate, and can then simply be slid into the provided hole in the pressure plate for assembly. The subsequent connection of individual elements of the clearance sensor is thus no longer required.

One feature of the invention resides broadly in the motor vehicle friction clutch with automatic wear adjustment, comprising: a flywheel 12; 112; 212 turning around a rotational axis A, a clutch housing 14; 114; 214 that is affixed to the flywheel 12; 112; 212 and turns with the flywheel, a pressure plate 16; 116; 216 that is fastened non-rotationally to the clutch housing 14; 114; 214 in such a manner that it can move axially in relation to the flywheel 12; 112; 212, a clutch disc rotationally arranged between the pressure plate 16; 116; 216 and the flywheel 12; 112; 212 with interposition of friction linings around the rotational axis A with relation to the flywheel 12; 112; 212, a membrane spring element 18; 118; 218 pre-stressed or pre-tensioned or biased between the pressure plate 16; 116; 216 in direction of the flywheel 12; 112; 212;, whereby the membrane spring element 18; 118; 218 acts on the pressure plate 16; 116; 216 in a radial outer area through a wear adjustment device 20; 120; 220 and is supported in a radial center area at the clutch housing 14; 114; 214, at least one clearance sensor 28; 128; 228 which is arranged on the pressure plate 16; 116; 216 and has a control lever segment 30; 130; 230 that acts with the wear adjustment device 20; 120; 220, an axial stop segment 32; 132; 232 which acts with the flywheel 12; 112; 212 to adjust for wear, whereby the clearance sensor 28; 128; 228 can be displaced axially in relation to the pressure plate 16; 116; 216 and at least one spring element 42, 48; 152, 252, which holds the clearance sensor 28; 128; 228 to the pressure plate 16; 116; 216; by means of a friction ratchet to axially fixate the clearance sensor 28; 128; 228 with respect to the pressure plate 16; 116; 216 characterized in that the axial fixation of the clearance sensor 28; 128; 228 is created by a friction ratchet of the control lever segment 30; 130; 230 at the pressure plate 16; 116; 216.

Another feature of the invention resides broadly in the motor vehicle friction clutch also comprising a first pin element 34; 134; 234 positioned to make contact on the side of the pressure plate 16; 116; 216 which faces away from the flywheel 12; 112; 212; said pin element extends axially and penetrates a first opening 38; 138; 238 in the control lever segment 30; 130; 230, whereby the friction ratchet of the control lever segment 30; 130; 230 is achieved through a pre-stressed or pre-tensioned or biased spring on the first pin element 34; 134; 234.

Yet another feature of the invention resides broadly in the motor vehicle friction clutch also comprising a plate spring or leaf or coach spring or compound spring element 152; 252 whose first end segment 154; 254 is positioned to make contact on the control lever segment 130; 230 and whose second end segment 156; 256 is supported by the pressure plate 116; 216 and/or the wear adjustment device to provide the pre-stressed spring of the control lever 130; 230 in the friction ratchet.

Still another feature of the invention resides broadly in the motor vehicle friction clutch also comprising: a second pin element 44 which is positioned to make contact radially inside of the first pin element 34 on the pressure plate 16, and penetrates a second opening 46 in the control lever segment 30, a first spring element 42 which acts between a free end segment of the first pin element 34 and the control lever segment 30 to push shut the control lever segment 30 in the direction of the pressure plate 16, a second spring element 48 which is arranged in the area of the second pin element 44 and acts between the pressure plate 16 and the control lever segment 30 to push the control lever segment 30 away from the pressure plate 16.

A further feature of the invention resides broadly in the motor vehicle friction clutch characterized in that the second spring element 48 is a coil pressure spring 48 which encloses the second pin element 44.

Another feature of the invention resides broadly in the motor vehicle friction clutch characterized in that the first spring element 42 is a coil pressure spring 42 which encloses the first pin element 34.

Yet another feature of the invention resides broadly in the motor vehicle friction clutch characterized in that the first and/or the second pin element 34, 44; 134, 144 is snap-fitted, riveted, or otherwise positioned to make contact with the pressure plate 16; 116; 216.

Still another feature of the invention resides broadly in the motor vehicle friction clutch characterized in that the axial stop segment 32; 132; 232 is formed in one piece with the control lever segment.

A further feature of the invention resides broadly in the motor vehicle friction clutch characterized in that the axial stop segment comprises an axial stop pin which is positioned to make contact on the control lever segment.

Another feature of the invention resides broadly in the motor vehicle friction clutch with automatic wear adjustment device, comprising: a flywheel 312; 412 which turns around a rotational axis A, a clutch housing 314; 414 which is positioned to make contact with the flywheel 312; 412 and can be turned with the flywheel, a pressure plate 316; 416 that is fastened non-rotationally to the clutch housing 314; 414 and can move axially in relation to the flywheel, clutch disc rotationally arranged between the pressure plate 316; 416 and the flywheel 312; 412 with interposition of friction linings around the rotational axis A in relation to the flywheel 312; 412, a membrane spring element 318; 418 installed to pre-stress the pressure plate 316; 416 in the direction of the flywheel 312; 412, whereby the membrane spring element 318; 418 acts on the pressure plate 316; 416 in a radial outer area through a wear adjustment device 320; 420 and is supported in a radial center area by the clutch housing 314; 414, at least one clearance sensor 328; 428 which is arranged on the pressure plate 316; 416 and has a control lever segment 330; 430 that acts with the wear adjustment device 320; 420, an axial stop segment 332; 432 that acts with the flywheel 312; 412 to adjust for wear, whereby the clearance sensor 328; 428 can be displaced axially in relation to the pressure plate 316; 416, and at least one spring element 352; 452, which pushes the clearance sensor 328; 428 into the friction ratchet at the pressure plate 316; 416 to axially fixate the clearance sensor 328; 428 in relation to the pressure plate 316; 416, characterized in that there is at least one spring element 352; 452 which comprises a plate spring.

Yet another feature of the invention resides broadly in the motor vehicle friction clutch characterized in that the first end segment 354; 454 of the plate spring 352; 452 is positioned to make contact on the control lever segment 352; 452.

Still another feature of the invention resides broadly in the motor vehicle friction clutch characterized in that the second end segment 456 of the plate spring 452 is supported by the pressure plate 416 to pre-stress the clearance sensor 428 into the friction ratchet.

A further feature of the invention resides broadly in the motor vehicle friction clutch characterized in that the plate spring 452 is curved away from the pressure plate 416 in a curved segment 466 and that the plate spring 452 is positioned to make contact with the pressure plate 416 in the area of the curved segment 466.

Another feature of the invention resides broadly in the motor vehicle friction clutch characterized in that the second end segment 356; 456 of the plate spring 352 is supported by the wear adjustment device 320; 420 to pre-stress the clearance sensor 328; 428 into the friction ratchet.

Yet another feature of the invention resides broadly in the motor vehicle friction clutch characterized in that the second end segment 356; 456 of the plate spring 352; 452 comprises at least one axial spring tongue segment 360, 364; 460, 464 which engages on a radial outer area of the wear adjustment device 320; 420 and essentially extends in axial direction.

Still another feature of the invention resides broadly in the motor vehicle friction clutch characterized in that the plate spring 352 comprises at least one radial spring tongue segment 362 which overlaps the wear adjustment device 320 on the side facing away from the pressure plate 316 and extends in a radial inward direction.

A further feature of the invention resides broadly in the motor vehicle friction clutch characterized in that the plate spring 352 has a radial spring tongue segment 362 and two axial spring tongue segments 360, 364, both of which are arranged on the opposite sides in relation to the axial plate tongue segment 362.

Another feature of the invention resides broadly in the motor vehicle friction clutch characterized in that the clearance sensor 328; 428 comprises an axial stop pin 352; 452 which is rigidly connected to the control lever segment 330, 430 or formed in one piece with the same, and that said axial stop pin penetrates an opening 336; 436 in the pressure plate 316; 416 and extends toward the flywheel 312; 412, whereby the friction ratchet is achieved by the interaction of the axial stop pin 332; 432 and the opening 336; 436 in the pressure plate 316; 416.

Yet another feature of the invention resides broadly in the motor vehicle friction clutch optionally having one or several of the above characteristics.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The following U.S. Pat. No. 3,485,330, issued Dec. 23, 1969, to Reiff, is hereby incorporated by reference as if set forth in its entirety herein.

The follow foreign patents, namely: Federal Republic of Germany No. DE 295 07 449 U1, issued May 2, 1995 to Fichtel & Sachs AG; Federal Republic of Germany No. DE 43 06 688 A1, issued Nov. 11, 1993 to Fichtel & Sachs AG; Federal Republic of Germany No. DE 44 12 107 A1, issued Nov. 3, 1994 to Fichtel & Sachs AG; Federal Republic of Germany No. 29 20 932, issued Nov. 29, 1979 to Borg Warner Corp.; are hereby incorporated by reference as if set forth in their entirety herein.

The German product catalog Zulieferer & Mashinenausrüster, 1986 pages 47–48, for Vogel-Verlag KG, Würzburg, is incorporated by reference as if set forth in its entirety herein.

The corresponding foreign patent publication applications, namely, Federal Republic of Germany Patent Application No. 196 10 427.0, filed on Mar. 16, 1996, having inventors Michael Weiss and Reinhold Weidinger, and DE-OS 196 10 427.0 and DE-PS 196 10 427.0, are hereby incorporated by reference as if set forth in their entirety herein.

The following U.S. Pat. Nos. 5,560,463, issued to Link et al.; and 5,540,313, issued to Weidinger; are hereby incorporated by reference as if set forth in their entirety herein.

The following U.S. patent applications Ser. No. 08/606, 416, filed Feb. 23, 1996, titled "Motor Vehicle Friction Clutch with Automatic Wear Adjustment", attorney docket no. NHL-FIS-172(FIS-61)-CIP, corresponding to Federal Republic of Germany Patent Application no. P 43 37 613 and 195 06 698, having inventors Achim Link and Reinhold Weidinger; Ser. No. 08/720,489, filed Sep. 30, 1996, titled "Friction Clutch for a Motor Vehicle Transmission and a Friction Clutch Having Automatic Adjustment for Wear", attorney docket no. NHL-FIS-61-C, corresponding to Federal Republic of Germany Patent Application no. P 43 37 613, having inventors Achim Link, Reinhold Weidinger, Heiko Schulz-Andres, Klaus Elsner, Rainer Weidmann, Ralph Nenninger and Michael Weiss; Ser. No. 08/555,770, filed Nov. 9, 1995, titled "Friction Clutch with Automatic Wear Compensation", attorney docket no. NHL-FIS-154, corresponding to Federal Republic of Germany Application no. P 44 40 412, having the inventor Reinhold Weidinger; Ser. No. 08/541,829, filed Oct. 10, 1995, attorney docket no. NHL-FIS-140, titled "Pulled-Type Membrane Spring Clutch with Wear Adjustment Mechanism"; corresponding to Federal Republic of Germany Application no. P 44 36 110, having the inventors Reinhold Weidinger and Jorg Sudau; and Ser. No. 08/541,628, filed Oct. 10, 1995, attorney docket no. NHL-FIS-141, titled "Friction Clutch with Adjustment for Wear", corresponding to Federal Republic of Germany Application no. P 44 36 111, having the inventor Reinhold Weidinger; are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch with automatic wear compensation for a motor vehicle, said friction clutch comprising:

a flywheel having an axis of rotation and defining an axial direction parallel to the axis of rotation;

a clutch housing;

said clutch housing being non-rotatably connected to said flywheel to rotate with said flywheel;

a clutch disc;

a pressure plate to apply an axially directed force to said clutch disc to engage said clutch disc with said flywheel;

said pressure plate having a first side and a second side;

said first side of said pressure plate being disposed adjacent said clutch disc;

said pressure plate being non-rotationally connected to said clutch housing;

said clutch disc being disposed between said flywheel and said pressure plate;

said clutch disc comprising a friction lining to contact said pressure plate and said flywheel during engagement of said clutch disc with said flywheel and said pressure plate;

a wear adjustment device to compensate for wear to said friction lining;

a membrane spring;

said membrane spring being disposed to bias said pressure plate;

at least one sensor to sense clearance between said flywheel and said pressure plate;

a spring disposed to bias at least a portion of said at least one sensor towards said flywheel;

said at least one sensor comprising a reference element;

said friction clutch comprising a first pin element;

said first pin element comprising first and second ends;

said reference element comprising a hole therethrough;

said first pin element being disposed through said hole in said reference element; and said reference element being disposed to frictionally engage and grip and also release said first pin element by relative tilting of said reference element with respect to said pressure plate during engagement and disengagement of said clutch so that said first pin element makes contact with sides of said hole and is frictionally gripped and also released by said sides of said hole.

2. The friction clutch according to claim 1 wherein:

said pressure plate comprises an opening for receiving said first pin element;

said second end of said first pin element is disposed in said opening;

said reference element is disposed substantially adjacent said second side of said pressure plate; and said second end of said first pin element is fixedly connected to said pressure plate.

3. The friction clutch according to claim 2 wherein:

said membrane spring is operatively connected to said wear adjustment device;

said at least one sensor is disposed adjacent said pressure plate;

said reference element is disposed to engage said wear adjustment device;

said wear adjustment device is disposed adjacent said pressure plate; and said wear adjustment device comprises first and second ring elements.

4. The friction clutch according to claim 3 wherein:

said at least one sensor comprises a stop segment;

said stop segment has an end;

said end of said stop segment is disposed adjacent said flywheel; and said stop segment is one of a) and b):
   a) an axial stop pin disposed in contact with said reference element; and
   b) formed in one piece with said reference element.

5. The friction clutch according to claim 4 wherein:

said first pin element comprises a retainer ring;

said retainer ring is disposed adjacent said first end of said first pin element;

said spring comprises a coil spring;

said coil spring is disposed about said first pin element; and said coil spring is disposed between said retainer ring and said reference element to bias said reference element toward said pressure plate.

6. The friction clutch according to claim 5 comprising:

a second pin element;

said first pin element being a first radial distance from said axis of rotation;

said second pin element being a second radial distance from said axis of rotation;

said first radial distance being greater than said second radial distance;

said opening for receiving said first pin element being a first opening;

said pressure plate comprising a second opening for receiving said second pin element;

said second pin element being fixedly disposed within said second opening;

said hole through said reference element being a first hole;

said reference element comprising a second hole therethrough;

said second pin element being disposed through said second hole;

a second coil spring;

said second coil spring being disposed about said second pin element; and said second coil spring being disposed between said reference element and said pressure plate to bias said reference element away from said pressure plate.

7. The friction clutch according to claim 6 wherein:

said first pin element is fixedly disposed within said first opening by one of a), b) and c):
   a) snap-fitting;
   b) riveting; and c) pressure-fitting; and said second pin element is fixedly disposed within said second opening by one of a), b) and c):
a) snap-fitting;
b) riveting; and
c) pressure-fitting.

8. The friction clutch according to claim 4 wherein:

said spring comprises a plate spring;

said plate spring has first and second end segments;

said first end segment of said plate spring is affixed to said reference element;

said first end segment of said plate spring is disposed adjacent said first pin element;

said second end segment of said plate spring is disposed adjacent said wear adjustment device; and said plate spring is disposed to bias said reference element to frictionally connect said first pin element to said reference element.

9. The friction clutch according to claim 8 wherein:

said second end segment of said plate spring comprises at least one axial tongue segment;

said at least one axial tongue segment is disposed substantially in said axial direction; and said at least one axial tongue segment is disposed adjacent said wear adjusting device.

10. The friction clutch according to claim 9 wherein:

said second end segment of said plate spring comprises at least one radial tongue segment;

said at least one radial tongue segment is disposed substantially transverse to said axial direction; and said at least one radial tongue segment is disposed adjacent said wear adjustment device.

11. The friction clutch according to claim 10 wherein said first pin element is fixedly disposed within said opening by press-fitting.

12. The friction clutch according to claim 10 comprising:

a plate spring rivet;

said plate spring rivet being disposed in said opening;

said plate spring rivet being disposed to connect said plate spring to said clutch housing; and said plate spring rivet being configured to receive said first pin element and to fix said first pin element with respect to said pressure plate.

\* \* \* \* \*

UNITED STATES PATENT AND TRADEMARK OFFICE
CERTIFICATE OF CORRECTION

PATENT NO. : 5,911,293
DATED : June 15, 1999
INVENTOR(S) : Michael Weiss and Reinhold Weidinger It is certified that error appears in the above-identified patent and that said Letters Patent is hereby corrected as shown below:

On the title page, item [56], under the U.S. Patent Documents section, after the "Uenohara." reference, add the following references.

| | | |
|---|---|---|
| --5,377,803 | 1-95 | Link et al. |
| 5,450,934 | 9-95 | Maucher |
| 5,560,463 | 10-96 | Link et al. |
| 5,570,768 | 11-96 | Uenohara et al. |
| 5,634,541 | 6-97 | Maucher |
| 5,690,203 | 11-97 | Link et al.--. |

Signed and Sealed this

Twenty-third Day of May, 2000

Attest:

Attesting Officer

Q. TODD DICKINSON

Director of Patents and Trademarks